United States Patent [19]

Rible

[11] Patent Number: 4,564,990

[45] Date of Patent: Jan. 21, 1986

[54] LEVER WRENCH FOR SNAP FIT VALVES

[76] Inventor: Richard A. Rible, 251 Morris Ave., Brick Town, N.J. 08723

[21] Appl. No.: 580,845

[22] Filed: Feb. 16, 1984

[51] Int. Cl.[4] .......... B23P 19/04

[52] U.S. Cl. .......... 29/267; 29/268; 81/349; 81/418

[58] Field of Search .......... 29/267, 268; 269/235, 269/236; 81/418, 421, 422, 423, 424, 419, 349

[56] References Cited

U.S. PATENT DOCUMENTS

| | | | |
|---|---|---|---|
| 952,013 | 3/1910 | Mignola, Jr. | 29/236 X |
| 974,368 | 11/1910 | Eaton | 29/268 |
| 997,243 | 7/1911 | Daley | 269/238 |
| 2,948,171 | 8/1960 | Lucibello | 81/418 X |

*Primary Examiner*—Frederick R. Schmidt

*Assistant Examiner*—Steven P. Schad

*Attorney, Agent, or Firm*—Clifford G. Frayne

[57] ABSTRACT

A lever wrench for the assembly and disassembly of snap fit valves having a first lever arm substantially linear in shape, the first lever arm having a handle end and a contact end with a punch pin removably secured to the contact end, a second lever arm rotatably mounted to the first lever arm and including a first leg and a second leg, the first leg having a plurality of depending contact points in alignment with the punch pin of the first lever arm, a third lever arm rotatably secured to the second leg of the second lever arm and comprising a handle secured to a disk whereby rotation of the third lever arm causes the first lever arm to rotate with respect to the second lever arm thereby causing the punch pin to cooperate with the contact points for the assembly and disassembly of the snap fit valve.

1 Claim, 7 Drawing Figures

LEVER WRENCH FOR SNAP FIT VALVES

FIELD OF INVENTION

The invention relates to a wrench and more particularly, to a lever wrench for the assembly and disassembly of the internal mechanism of a snap fit valve to permit the replacement of valve gaskets.

BACKGROUND OF INVENTION

In the chemical industry, multi-positional snap fit valves which are either manually or mechanically operated are utilized in a variety of chemical processes. The valves of the type to which the present invention is directed are most commonly used with respect to filter presses of varying sizes.

Depending upon the chemical process being undertaken by the filter press, the fluids in the filter press may be either extremely acidic or caustic. As such, the valve and associated gaskets, through normal use, is subject to not only normal mechanical wear, but also attack and degradation as a result of the fluids passing through the valve. Additionally, a filter press normally contains a plurality of valves spaced in close proximity to each other for the drainage of fluids from the filter press. Due to the wear and tear on the valve gaskets and the attack and degradation by the specific fluids within the press, it is often necessary to replace the valve gaskets to ensure a tight fitting and the reduction in the loss of fluid from the valve. Due to their close proximity and spacing on the filter press, the removal of the valve interior and the replacement of the gaskets oftentimes presents spacial problems to the mechanic in order to remove the valve interior and due to the spacial problems, can also present a hazard to the mechanic depending upon the specific fluids being utilized in the filter press and the exposure of such fluids to the mechanic and his hands regardless of whether or not he utilizes protective gloves. Additionally, where spacial problems exist, the practice has been to stop the chemical process and completely replace the valve thereby causing substantial loss of production time and increased costs, since it was easier to remove the valve completely than to attempt to disassemble the valve in place. The present invention provides for a lever wrench designed with respect to snap fit valves which permits the easy assembly and disassembly of the valve and its internal mechanism and for the replacement of the gaskets without exposing the mechanic's hands to the fluid associated with the chemical process and further provides the mechanic with mechanical advantage for the easy assembly and disassembly of the valve's internal mechanism and further provides a tool which can operate in the spacial confines presented by a plurality of valves in proximity to each other.

OBJECTS OF THE INVENTION

An object of the present invention is to provide a novel lever wrench for snap fit valves which facilitates the assembly and disassembly of snap fit valves.

A further object to the present invention is to provide a novel lever wrench which provides the user with mechanical advantage for the easy assembly and disassembly of snap fit valves.

A still further object of the present invention is to provide a novel lever wrench for snap fit valves which overcomes the spacial confines of snap fit valves spaced in close proximity with each other in a chemical process.

A still further object to the present invention is to provide a novel valve wrench which permits the easy assembly and disassembly of snap fit valves while protecting the mechanic from fluids which may be flowing through the snap fit valve, which fluids could be harmful to the mechanic.

SUMMARY OF THE INVENTION

These and other objects of the present invention are achieved by a lever wrench for the assembly and disassembly of snap fit valves having a first lever arm substantially linear in shape, the first lever arm having a handle end and a contact end with a punch pin removably secured to the contact end, a second lever arm rotatably mounted to the first lever arm and including a first leg and a second leg, the first leg having a plurality of depending contact points in alignment with the punch pin of the first lever arm, a third lever arm rotatably secured to the second leg of the second lever arm and comprising a handle secured to a disk whereby rotation of the third lever arm causes the first lever arm to rotate with respect to the second lever arm thereby causing the punch pin to cooperate with the contact points for the assembly and disassembly of the snap fit valve.

BRIEF DESCRIPTION OF THE DRAWINGS

A better understanding of the present invention as well as other objects and advantages thereof, will become apparent upon consideration of the detailed disclosure thereof, especially when taken with the accompanying drawings wherein.

DETAILED DESCRIPTION OF THE DRAWING

Figure 1:
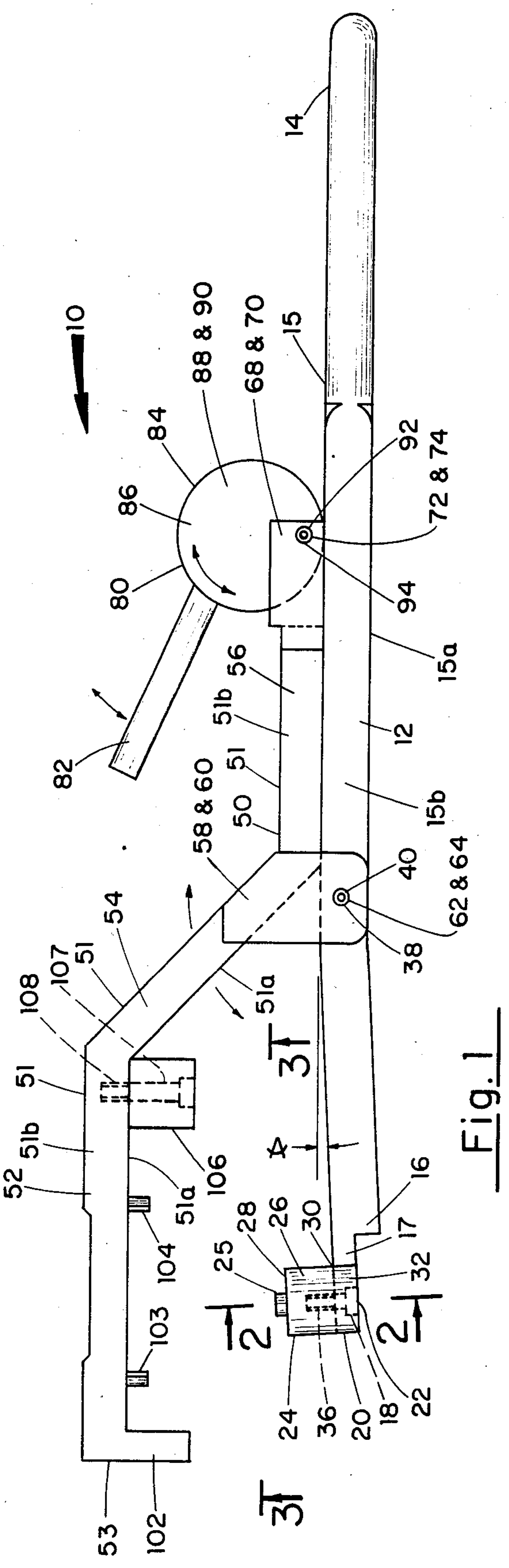
FIG. 1 is a side elevational view of the lever wrench which is the object of the present invention.

Referring to FIG. 1, there is illustrated a lever wrench of the present invention designated generally as 10. Lever wrench 10 comprises a first lever arm 12 having a first handle end 14 and a second end 16. First lever arm 12 is rectangular in cross sectional area at its mid point having an upper planer surface 15, a lower planer surface **15*a* and planer vertical sidewalls 15*b*. First lever arm 12 is tapered to a circular cross sectional area at handle end 14. First lever arm 12 is tapered to a reduced rectangular cross sectional area 15, proximate to second end 16 in order to facilitate operation with a plurality of snap fit valves when spacial considerations are required as will be more fully set forth hereafter. Second end 16 of first lever arm 12 has positioned therethrough, a throughbore 18, proximate to tip 20 of first lever arm 12. Throughbore 18** is for the receipt of a removable fastening means 22 to secure to second end 16 of first lever arm 12, punch pin 24.

Punch pin 24 comprises a solid cylindrical body portion 26 having an upper planer circular surface 28 and a recessed lower planer surface 30 whose width is substantially identical with the width of first lever arm 12. Lower recessed planer surface 30 is defined by furcations 32 and 34 which extend downwardly from punch body 26. Recessed lower planer surface 30 has axially and centrally positioned therein, a screw cavity 36 in axial alignment with the axis of punch pin body 26, for receipt of fastener means 22. Upper planer circular surface 28 of punch pin 24 has axially positioned thereon an aligning tooth 25. Punch pin 24 is secured to first lever arm 12 by positioning punch pin body 26 such that recessed lower planer surface 30 is in alignment with the second end 16 of first lever arm 12 and in communication with upper planer surface 15 of first lever arm 12 such that throughbore 18 in first lever arm 12 is in alignment with screw cavity 36 in the recessed lower planer surface 30 of punch pin body 26. In this configuration, furcations 32 and 34 of punch pin 24 extend downwardly and are in intimate contact with sidewalls 15*b* of first lever arm 12. Fastener means 22, which in the present invention comprises an Allen flat head screw, is then inserted through throughbore 18 in second end 16 of first lever arm 12 and secured into screw cavity 36 of punch pin body 26.

First lever arm 12 has positioned transversely therethrough, throughbore 38, proximate to the mid point of first lever arm 12. Throughbore 38 is for the receipt of a roll pin 40 to secure second lever arm 50 to first lever arm 12 in limited rotatable relationship to each other as described here-after.

Second lever arm 50 comprises a first substantially horizontal leg 52, a second leg 54 obliquely angled to first leg 52 and third substantially horizontal leg 56 obliquely angled to second leg 54. Second lever arm 50 is substantially rectangular in cross sectional area in legs 52, 54 and 56 having a planer upper surface 51, a planer lower surface 51*a* and planer vertical sidewalls 51*b*. The dimensions of the cross sectional area of second lever arm 50 are substantially identical to those of first lever arm 12. There is secured to second leg 54, proximate to the oblique angle formed by second leg 54 and third leg 56, vertical planer furcations 58 and 60. Vertical planer furcations 58 and 60 depend downwardly from planer vertical sidewalls 51*b* of second leg 54 of second lever arm 50 and have openings 62 and 64 in horizontal alignment therethrough. Vertical planer furcations 58 and 60 respectively are positioned to align with throughbore 38 in first lever arm 12 so as to permit the passage of roll pin 40 through opening 62, of first vertical planer furcation 58, through throughbore 38 of first lever arm 12 and through opening 64 of second vertical furcation 60 so as to secure in limited rotatable relationship, second lever arm 50 to first lever arm 12.

Secured to end 66 of horizontal leg 56 are furcations 68 and 70. Furcations 68 and 70 are secured to sidewalls 51*b* and extend horizontally outwardly from horizontal leg 56, parallel with sidewalls 15*b* of first lever arm 12. Furcations 68 and 70 have openings 72 and 74 in horizontal alignment therethrough. Third lever arm 80 is secured to second lever arm 50 by means of furcations 68 and 70. Third lever arm 80 comprises a lever handle 82 secured to the circumferential sidewall 84 of circular disk 86. Circular disk 86 comprises circumferential sidewall 84 and first planer circular side 88 and second planer circular side 90. Throughbore 92 is positioned off center, approximate to the circumferential sidewall 84 of circular disk 86 in order to provide a cam action with first lever arm 12 as described hereafter. In the configuration as shown, throughbore 92 is positioned approximately two hundred and sixty degrees from the point where lever handle 82 is secured to circumferential sidewall 84. Throughbore 92 of circular disk 86 is positioned so as to align with openings 72 and 74 in furcations 68 and 70 of horizontal leg 56 of second lever arm 50. Third lever arm 80 is rotatably secured to second lever arm 50 by means of a roll pin 94 secured in openings 72 and 74 of furcations 68 and 70 of second lever arm and throughbore 92 in circular disk 86. In this position, third lever arm 80 is rotatably maneuverable about roll pin 94. Further, in this position, circumferential sidewall 84 of circular disk 86 is in rotatable contact with the upper planer surface 15 of first lever arm 12. In this fashion, when third leg 56 of second lever arm 50 is parallel to and in contact with first lever arm 12, handle 82 of third lever arm 80 is in a forward position. When handle 82 of third lever arm 80 is rotated about roll pin 94, toward handle end 14 of first lever arm 12, the circumferential sidewall 84 of circular disk 86 contacts first lever arm 12 on upper planer surface 15 and circular disk 86 operates in a cam fashion to cause second lever arm 50 to rotate about roll pin 40 thus causing horizontal leg 52 and punch pin 24 on second end 16 of first lever arm 12 to move toward each other.

Depending downwardly from lower planer surface 51*a* of first horizontal leg 52 of second lever arm 50 are a plurality of contact points designated as aligning teeth and aligning blocks. First aligning block 102 is secured to first horizontal leg 52 proximate to end 53 of first horizontal leg 52 proximate to end 53 of first horizontal leg 52. Positioned on first horizontal leg 52 of second lever arm 50, on lower planer surface 51*a* are two semi-circular aligning teeth 103 and 104 which depend downwardly from lower planer surface 51*a*. Semi-circular aligning teeth 103 and 104 are positioned concave to each other and are spaced on the lower planer surface 51*a* of first horizontal leg 52 to permit the assembly of a snap fit valve as more fully set forth hereafter. Positioned on lower planer surface 51*a* of first horizontal leg 52 of second lever arm 50 is a second aligning block 106. Second aligning block 106 is removably secured to lower planer surface 51*a* by means of a throughbore 107 through second aligning block 106 and a screw cavity 108 in lower surface 51*a* of first horizontal leg 52. In this configuration, second aligning block 106 is removably secured to first horizontal leg 52 at its juncture with second leg 54. As will be more fully set forth hereafter, aligning blocks 102 and 106 cooperate with punch pin 24 in the disassembly of a snap fit valve and aligning teeth 103 and 104 cooperate with punch pin 24 in the assembly of a snap fit valve.

Figure 2:
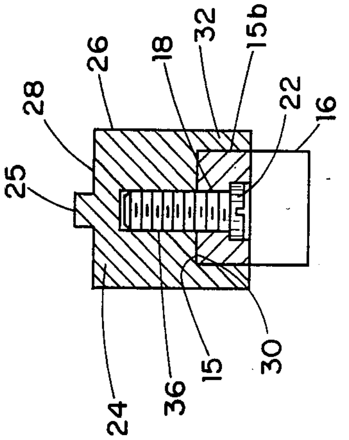
FIG. 2 is a cross sectional view along axis A—A of FIG. 1.
Figure 3:
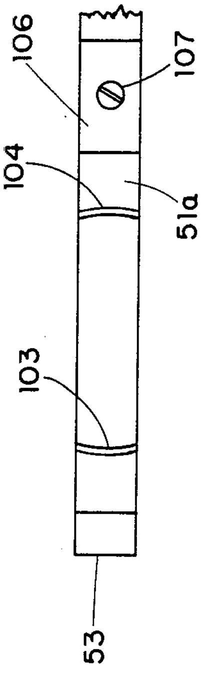
FIG. 3 is a cross sectional view along axis B—B of FIG. 1.

Referring now to FIG. 2 and 3, there is shown side elevational views of a snap fit valve designated generally as 200 to which the lever wrench 10 which is the subject matter of the present invention has application. Snap fit valve 200 is of a two piece construction having a body 202 and a multi-positional lever arm assembly 204 as shown in more detail in FIG. 4. Body portion 202 is of one-piece construction having a rectangular base portion 206 which base portion 206 has a plurality of openings 208 passing therethrough. Openings 208 permit valve 200 to be secured to the piece of machinery to which it has application. Cylindrical support means 210 and 212 depend outwardly from base portion 206 of valve 200 defining two separate conduit means 210a and 212a which pass through base portion 206 and terminate in truncated conical interior chamber 216 of generally cylindrical body portion 218 of valve 200. Third cylindrical conduit means 220 extends outwardly from cylindrical body portion 218.

As shown in FIG. 2, truncated conical interior chamber 216 is defined by sidewall 222 at which point conduit means 210a, 212a and 220 terminate and; annular end wall 224, annular end wall 224 defining opening 226 therethrough and is open on the side opposite annular end wall 224 as shown in FIG. 3 which depicts the valve body 202 from its opposite side without lever arm assembly 204.

Figure 4:
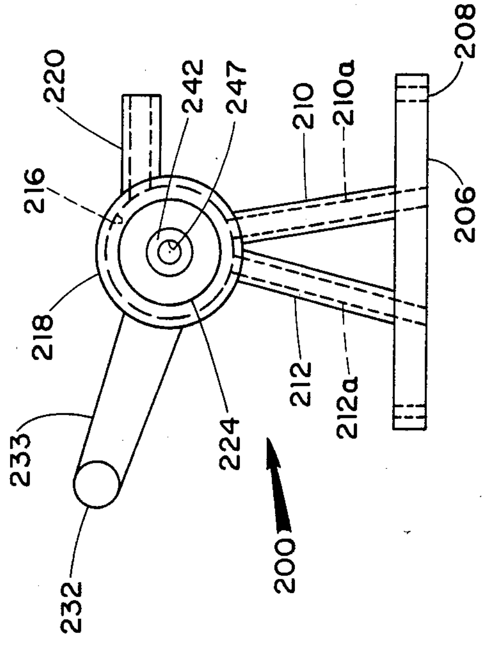
FIG. 4 is a first side elevational view of a snap fit valve to which the invention has application.
Figure 7:
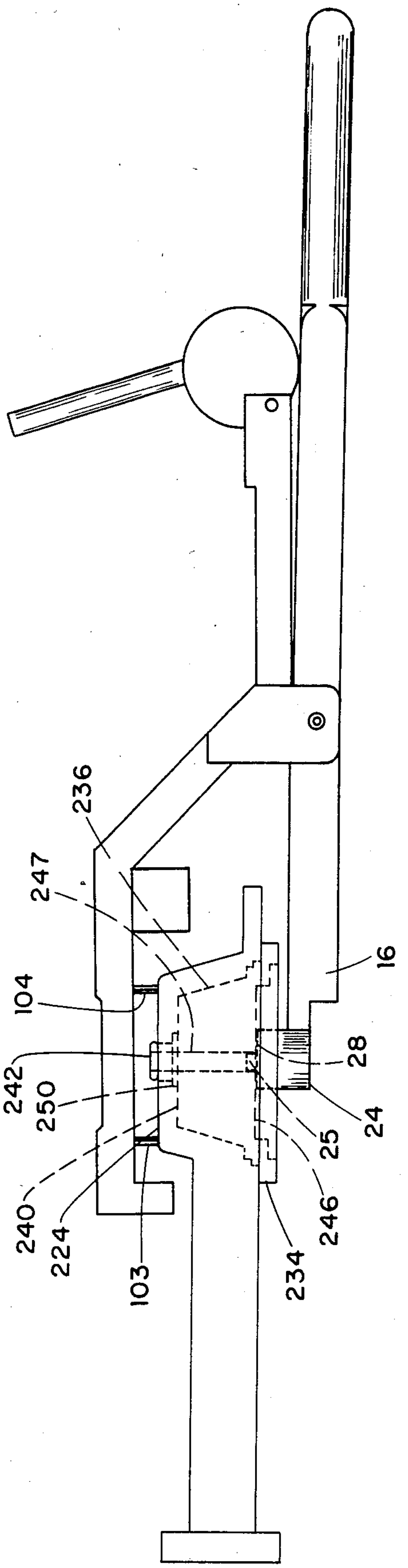
FIG. 7 is a side elevational view of the assembly of a snap fit valve in cooperation with the lever wrench.

Lever arm assembly 204 is of one-piece construction as shown in FIG. 4, comprising a handle portion 232, a lever arm 233 and a cylindrical disk 234 having a first side 235 and a second side 237. Cylindrical disk 234 has depending from first side 235, a truncated conical body portion 236 which defines annular lip 238 about cylindrical disk 234. Truncated conical body portion 236 is substantially identical in size with truncated conical interior chamber 216 and has a plurality of grooves 215 for the selective flow of fluids when the valve is operational. Depending upwardly from upper planer surface 240 of truncated conical body portion 236 is a male nipple 242. Male nipple 242 is cylindrical in shape having an annular recess 243 which is substantially identical in cross sectional area to opening 226 in annular end wall 224 of truncated conical interior chamber 216 while the general cross sectional area of male nipple 242 is slightly larger in cross sectional area to opening 226. Cylindrical disk 234 is recessed on second side 237 having a first recessed annular flange 244 and a recessed circular planer surface 246. A throughbore 247 is axially aligned and passes through male nipple 242 to recessed circular planer surface 246. The diameter of throughbore 247 is substantially identical to aligning tooth 25 on punch pin 24. Lever arm assembly 204 is press fit into valve 202 in the following manner. A planer gasket 249 having openings corresponding to conduit means 210a and 212a is form fit on annular lip 230 of truncated conical interior chamber 216 as shown in FIG. 3. An O-ring 248 is positioned on flange 238 of lever arm assembly 204 and O-ring 250 is positioned on male nipple 242 of lever arm assembly 204. Truncated conical body portion 236 is press fit into truncated conical interior chamber 216 of cylindrical valve body 218 such that male nipple 242 engages annular end wall 224 of truncated conical interior chamber 216 by partially passing therethrough so that annular recess 243 engages end wall 224. In this configuration, O-ring 248 and O-ring 250 cooperate with annular end wall 224 and annular flange 230 to prevent fluid leakage.

Valves of this type are used in many instances with respect to filter presses. As such, the fluids which flow through conduit means 210a or 212a may in many instances be either acidic or caustic. As such, the valve gaskets of lever arm assembly 204 may become deteriorated either through action as a result of the fluids with which they come in contact or deteriorated as a result of normal mechanical use. An operator would have to remove lever arm assembly 204 from valve body 202 in order to replace the aforementioned gaskets. Since valve 200 would be positioned in parallel along a filter press, the amount of space available to an operator in removing lever arm assembly 204 would be restricted. The other option would be to completely remove valve 200 from the filter press in order to effectuate the replacement of gaskets. Lever wrench 10 is specifically designed to facilitate the removal of lever arm assembly 204 from body 202 of valve 200 to permit the operator to change the gaskets in the valve and to replace lever arm assembly 204 while the valve remains secured to the chemical apparatus. Additionally, lever wrench 10 provides the operator with a greater degree of safety in the removal and fitting of new gaskets by permitting the operator's hands to be well removed from the valve itself and any possible communication with the fluids which pass through the valve. The removal of lever arm assembly 204 from valve body 202 is accomplished by positioning lever wrench 10 in the following manner.

Figure 5:
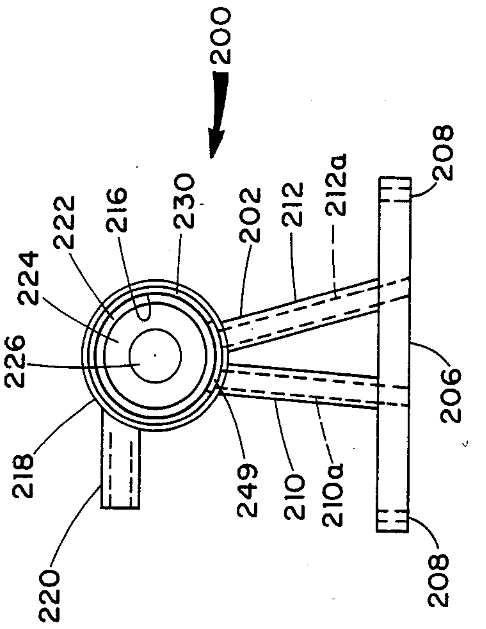
FIG. 5 is opposite side elevational view of the snap fit valve without a lever arm assembly to which the present invention has application.
Figure 6:
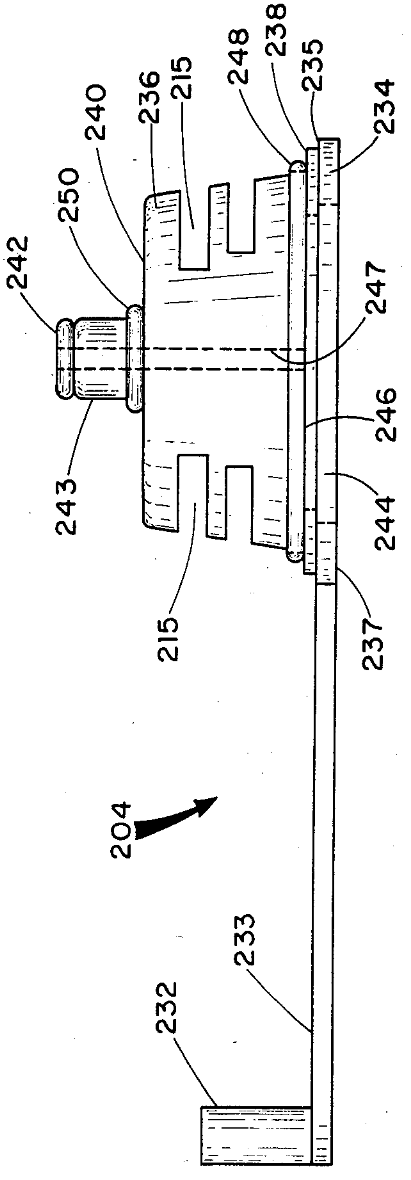
FIG. 6 is a side elevational view of the lever arm assembly of the snap fit valve.

Lever wrench 10 is placed in the fully open position wherein handle 82 of third lever arm 80 is in the forward position. In this configuration, lever wrench 10 is positioned so that cylindrical body portion 218 of snap fit valve 200 is positioned between first lever arm 12 and horizontal leg 52 of second lever arm 50. In this configuration, upper planer cylindrical surface 28 of punch pin 24 is in intimate contact with male nipple 242 of truncated conical body portion 236 of lever arm assembly 204 and aligning tooth 25 is engaged in throughbore 247. Aligning blocks 102 and 106 of first leg 52 of second lever arm 50 contact valve body 202 on its opposite side. As third lever arm 80 is rotated rearwardly, aligning blocks 102 and 106 contact valve body 202. In this fashion, handle 82 of third lever arm 80 is rotated toward handle end 14 of first lever arm 12 causing circular disk 86 to operate in a cam fashion against first lever arm 12 thereby causing punch pin 24 to exercise pressure on male nipple 242, thus disengaging male nipple 242 from annular end wall 224 of truncated conical interior chamber 216 and thereby releasing lever arm assembly 204 from valve body 202 in order to change and/or repair the gaskets. Lever arm assembly 204 is reassembled with body 202 by reversing lever wrench 10 as shown in FIG. 5. Punch pin 24 and aligning tooth 25 contact recessed planer circular surface 246 and throughbore 247 respectively and aligning teeth 103 and 104 contact the outer surface of annular end wall 224. Aligning teeth 103 and 104 are spaced apart and concave in shape so as not to interfere with opening 226. In this configuration, lever handle 80 is rotated rearwardly, punch pin 24 forces lever arm assembly 204 and in particular, truncated conical body portion 236 into truncated conical interior chamber 216 with aligning teeth 103 and 104 providing the resistance against annular end wall 224. Male nipple 242 is forced partially through opening 226 thus securing lever arm assembly 204 to valve body 202.

First lever arm 12 which is substantially linear in shape contains a slight angle commencing proximate to throughbore 38. In the present configuration, the angle approximates five degrees and it serves to position second end 16 of first lever arm 12 parallel to first leg 52 of second lever arm 50 such that punch pin 24 is perpendicular to first leg 52 of second lever arm 50 when the cam action of third lever arm 80 is commenced and punch pin 24 engages the snap fit valve. Additionally, it provides sufficient space to permit second end 16 of first lever arm 12 and first leg 52 of second lever arm 50 to surround and embrace valve body 202.

The reduced cross sectional area of second end 16 of first lever arm 12 and the reduced cross sectional area of first leg 52 of second lever arm 50 are designed to permit the easy insertion of lever wrench 10 between snap fit valves in close proximity to each other so as to permit the lever wrench to assemble or disassemble the snap fit valve which it is embracing.

It will be recognized by those skilled in the art, that snap fit valves come in a variety of sizes and that the dimensions of the lever wrench 10 may vary depending upon the size of the valve to which it is applied. Nevertheless, while the invention has been described in connection with an exemplary embodiment thereof, it will be understood that many modifications will be apparent to those of ordinary skill in the art and that this application is intended to cover any adaptations or variations thereof. Therefore, it is manifestly intended that this invention be only limited by the claims and the equivalents thereof.

I claim:

1. A lever wrench for the assembly and disassembly of snap-fit valves which comprises a first lever arm, substantially linear in shape, said first lever arm having a handle and a contact end, said contact end obliquely angled from said handle end;

a cylindrical punch pin having a planer upper surface and an aligning tooth centrally positioned thereon removably secured to said contact end of said first lever arm;

a second lever arm rotatably mounted to said first lever arm and including a first leg and a second leg, said first leg including a pair of rectangular depending contact points positioned at the outer end and the inner end of said first leg, said rectangular depending contact points in alignment with said first lever arm and said punch pin for cooperation with said first lever arm and said punch pin for the disassembly of said snap-fit valve, and a pair of depending concave contact points positioned between said depending rectangular contact points on said first leg of said second lever arm for cooperation with said punch pin for the assembly of said snap-fit valve;

a third lever arm rotatably secured to said second leg of said second lever arm and comprised of a handle secured to a disc whereby rotation of said third lever arm causes said first lever arm to rotate with respect to said second lever arm thereby to cause said punch pin to cooperate with said contact points to affect the assembly and disassembly of the snap-fit valve.

* * * * *